United States Patent [19]

Yuan

[11] Patent Number: 4,632,339

[45] Date of Patent: Dec. 30, 1986

[54] SPACECRAFT PAYLOAD EJECTION MECHANISM

[75] Inventor: Mark S. Yuan, Fountain Valley, Calif.

[73] Assignee: Hughes Aircraft Company, Los Angeles, Calif.

[21] Appl. No.: 685,700

[22] Filed: Dec. 24, 1984

[51] Int. Cl.$^4$ .............................................. B64G 1/22
[52] U.S. Cl. ............................................... 244/158 R
[58] Field of Search ........... 244/158 R, 137 R, 137 A, 244/161; 124/16, 26, 41 R

[56] References Cited

U.S. PATENT DOCUMENTS

| | | | |
|---|---|---|---|
| 3,254,640 | 6/1966 | Sprouse | 124/16 |
| 3,380,687 | 4/1968 | Wrench et al. | 244/158 R |
| 3,420,470 | 1/1969 | Meyer | 244/158 R |
| 3,760,730 | 9/1973 | Osborne et al. | 244/158 R |
| 4,015,507 | 4/1977 | Toy et al. | 244/137 R |
| 4,067,308 | 1/1978 | Andersen et al. | 124/16 |
| 4,164,928 | 8/1979 | Meares | 124/16 |
| 4,181,062 | 1/1980 | Bernstein et al. | 89/1.5 F |
| 4,303,214 | 12/1981 | Wittman et al. | 244/158 R |
| 4,506,852 | 3/1985 | Adams et al. | 244/158 R |

*Primary Examiner*—Trygve M. Blix
*Assistant Examiner*—Rodney Corl
*Attorney, Agent, or Firm*—S. M. Mitchell; M. J. Meltzer; A. W. Karambelas

[57] ABSTRACT

An ejection mechanism for imparting an ejection force to substantially constant locus of points on a payload ejected from a spacecraft is disclosed. The ejection mechanism includes a rod having a contact end for abutting contact with the locus of points. The rod is slideably mounted within a housing defining a first aperture from which the rod is driven toward the locus of points. Means are provided for driving the rod toward the payload to eject the payload, and means are provided for securing the housing to the spacecraft. The ejection mechanism also includes means for permitting the contact end of the rod to substantially maintain abutting contact with the locus of points as the rod is driven toward the locus and the payload is ejected from the spacecraft.

14 Claims, 11 Drawing Figures

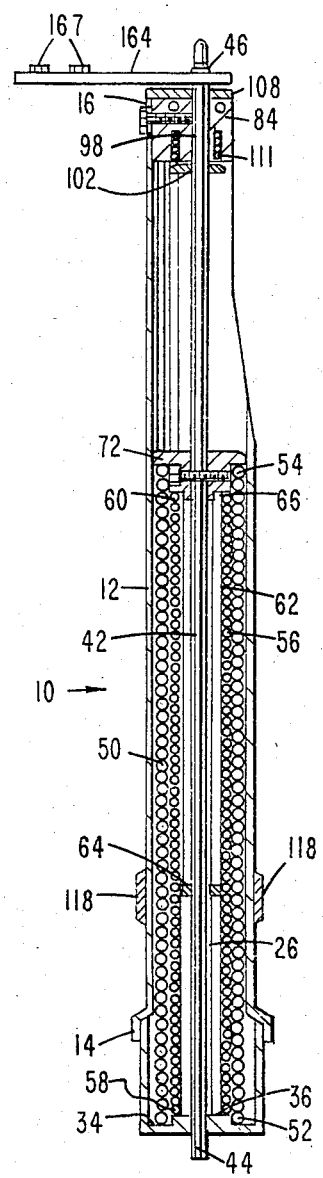
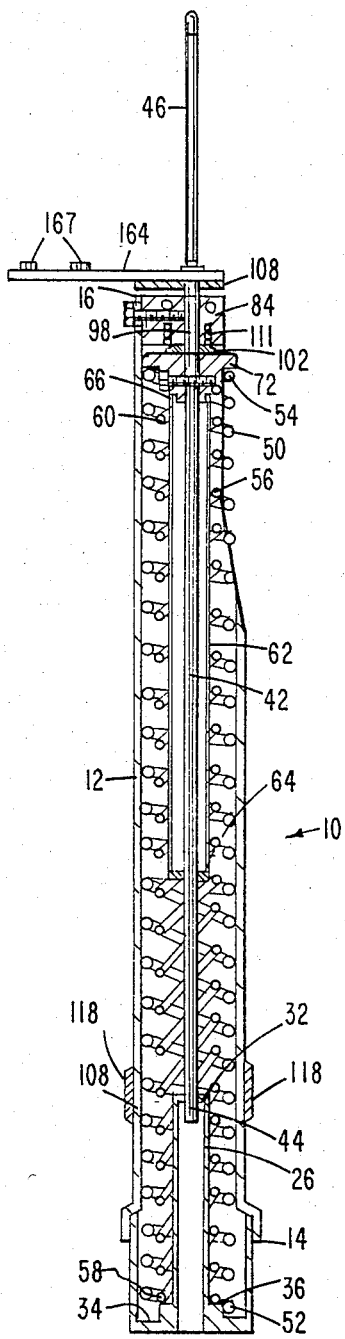
Fig. 1a.
Fig. 1b.

SPACECRAFT PAYLOAD EJECTION MECHANISM

The Government of the United States has rights in this invention pursuant to Contract No. F04701-79-C-0006 awarded by Department of the Air Force.

BACKGROUND OF THE INVENTION

1. Field of the Invention

The invention relates generally to mechanisms for ejecting payloads from a spacecraft and more particularly to mechanisms for ejecting payloads ejected with translational and rotational motion from a spacecraft.

2. Description of the Related Art

Commonly assigned U.S. Pat. No. 4,359,201 describes an arrangement for launching a payload with translational and rotational motion from a spacecraft. The arrangement comprises a U-shaped or open-ended cradle, and a payload with at least one attachment member on one side thereof and at least two attachment members in longitudinally spaced positions on an opposite side thereof. The payload straddles the open end of the cradle, and the attachment members releasably engage the cradle and support the payload in the open end of the cradle. The attachment members define corners of a triangle which encloses the center of mass of the payload. An ejection mechanism having a part disposed between the cradle and the one attachment member applies a tangential ejection force to one side of the payload at the location of the one attachment member to eject the payload with translational and rotational motion.

Commonly assigned U.S. Pat. No. 4,303,214 discloses a similar arrangement and describes an ejection mechanism in greater detail. The ejection mechanism described therein comprises a plurality of helical coil springs which drive a push rod which extends upward from the mechanism and engages a fitting comprising a portion of the payload. During payload ejection, the spring-driven push rod imparts an ejection force to the fitting in a direction toward the open end of the U-shaped cradle.

While earlier ejection mechanisms generally have been satisfactory, there have been shortcomings with their use. More particularly, the simultaneous translational and rotational motion of the payload during ejection resulted in frictional energy loss as the push rod slid along the surface of the fitting during payload ejection. This frictional loss resulted in undesirable effects on the motion of the payload.

Thus, a need exists for an ejection mechanism which provides a tangential ejection force to a payload ejected with translational and rotational motion from a spacecraft and which provides such an ejection force without introducing unwanted frictional energy loss. The present invention meets this need.

SUMMARY OF THE INVENTION

The present invention provides a spacecraft payload ejection mechanism for imparting an ejection force to a payload ejected from a spacecraft without incurring substantial unwanted frictional energy loss. The mechanism comprises a rod having a contact end which is placed in abutting contact with a substantially constant locus of points on the payload. Means are provided for securing the rod to the spacecraft and for permitting movement of the rod relative to the spacecraft. Means are provided for driving the rod toward the payload to which the ejection force is imparted, and means are provided to permit the contact end of the rod to maintain abutting contact with the locus of points as the rod is driven toward the payload during its ejection from the spacecraft.

The mechanism substantially limits unwanted frictional energy loss between the payload and the rod by substantially eliminating any relative sliding motion between the payload and the contact end of the rod. The mechanism achieves this result by permitting the contact end of the rod to follow the motion of the substantially constant locus of points and to maintain abutting contact with the locus as the payload leaves the spacecraft.

These and other features and advantages of the present invention will become more apparent from the following detailed description of an exemplary embodiment thereof, as illustrated in the accompanying drawings.

DESCRIPTION OF THE DRAWINGS

The purpose and advantages of the present invention will be apparent to those skilled in the art from the following detailed description in conjunction with the appended drawings in which:

FIGS. 1a and 1b are longitudinal section views of a housing and rod-driving assembly and retaining collar of a preferred embodiment of the present invention in respective pre-ejection and post-ejection configurations;

DETAILED DESCRIPTION OF THE PREFERRED EMBODIMENT

Figure 2:
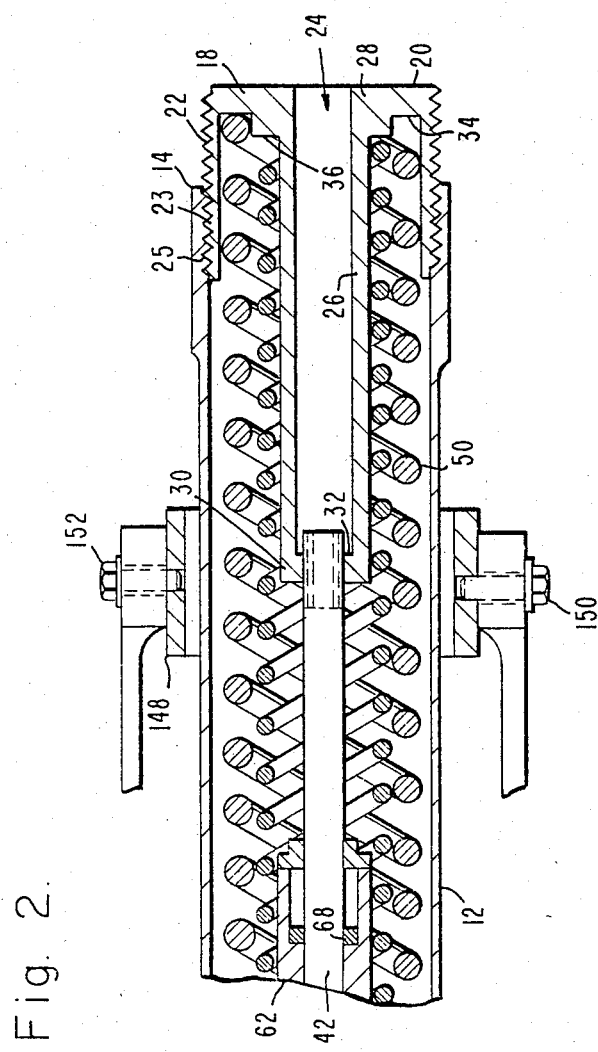
FIG. 2 is an enlarged longitudinal section view of the base end of the housing and rod-driving assembly and a portion of the mounting assembly of the preferred embodiment of FIGS. 1a and 1b.

The present invention comprises a novel ejection mechanism for imparting an ejection force to a substantially constant locus of points on a payload ejected from a spacecraft. The following description is presented to enable any person skilled in the art to make and use the invention, and is presented in the context of a particular application and its requirements. Various modifications to the preferred embodiment will be readily apparent to those skilled in the art, and the generic principles herein may be applied to other embodiments and applications. Thus, the present invention is not intended to be limited to the embodiment shown, but it is to be accorded the widest scope consistent with the principles and features disclosed herein.

Referring to FIGS. 1a and 1b, a preferred embodiment of the ejection mechanism 10 is shown. The ejection mechanism 10 includes an elongated hollow substantially cylindrical open-ended housing 12 having a first end 14 and a second end 16. As best illustrated in the enlarged view shown in FIG. 2, a first end closure 18 is secured to the first end 14 of the housing 12. The first end closure 18 includes a substantially circular base 20 (shown in transverse section only) and a cylindrical wall 22, with an outer threaded surface 23, upstanding from the perimeter of the base 20. The base 20 defines a circular central opening 24 surrounded by a cylindrical tube 26 upstanding from the perimeter thereof which extends concentrically into the housing 12 The tube 26 has a first end 28 adjacent to the base 20 and a second end 30 vertically spaced from the base 20 within the housing 12. A circular inward-directed flange 32 projects from the second end 30 of the tube 26. The base 20 defines an annular first shoulder 34 adjacent to the cylindrical wall 22 between the cylindrical wall 22 and the tube 26, and the base 20 defines an annular second shoulder 36 upstanding from the base 20 between the first shoulder 34 and the tube 26. The first end closure 18 is secured to the housing 12 by suitable means. For example, the threaded outer surface 23 of the cylindrical wall 22 may interfit with a complementary threaded inner surface 25 of the housing 12.

FIGS. 1a and 1b show an integral elongated cylindrical hollow rod 42 which is slidably mounted concentrically within the housing 12 for axial movement relative to the housing 12. The rod 42 includes a first segment 44 adjacent to the first end 14 of the housing 12, sized for slidable movement through the cylindrical upstanding tube 26. The inward directed-flange 32 of the tube 26 substantially prevents unwanted transverse movement of the first segment 44. The rod 42 also includes a second segment 46 adjacent to the second end 16 of the housing 12.

Figure 3:
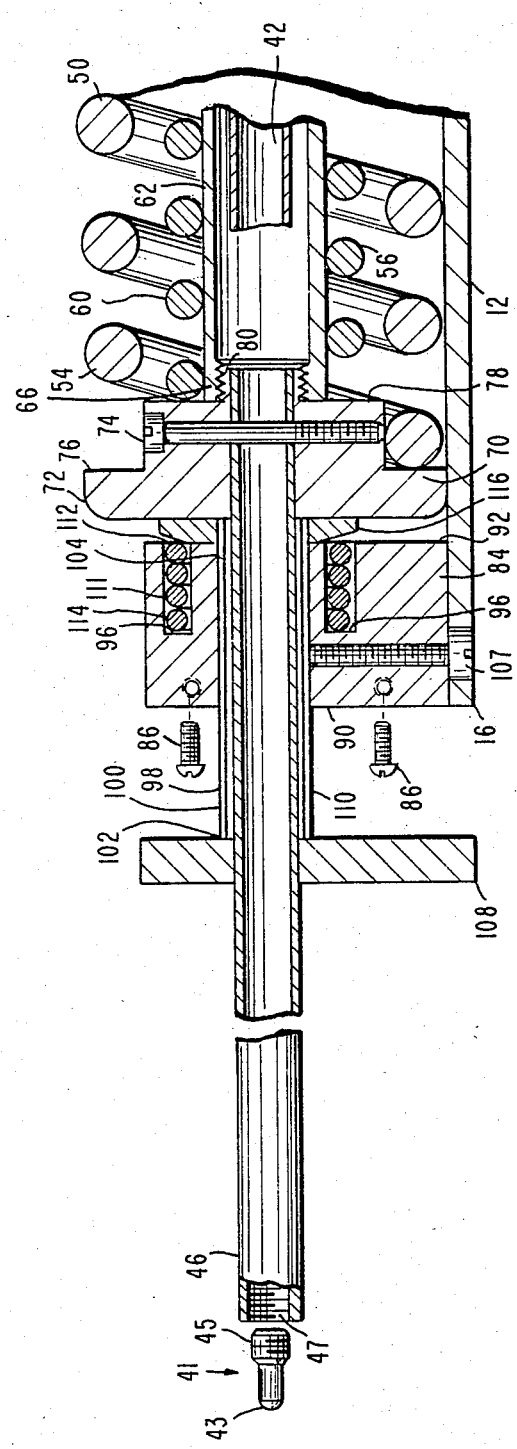
FIG. 3 is an enlarged longitudinal partially exploded section view of the rod ejection end of the housing and rod-driving assembly of the preferred embodiment of FIGS. 1a and 1b.

As best illustrated in the enlarged view of FIG. 3, an end tip 41, having a hemispherical end 43, is secured to the end of the second segment 46 by fastening means such as by a threaded cylindrical stem 45 depending from the tip 41 opposite the hemispherical portion 43. The threaded cylindrical stem 45 interfits with a complementary threaded inner surface 47 of the second segment 46.

Referring once again to FIGS. 1a and 1b, a first cylindrical compression spring 50 having a first end 52 and a second end 54 is concentrically disposed about the rod 42 within the housing 12. The first spring 50 is diametrically sized such that its first end 52 is seated on the annular first shoulder 34. The housing 12, which is disposed about the first spring 52 in close physical proximity thereto, serves as a first spring guide to substantially prevent buckling of the first spring 50.

A second cylindrical compression spring 56, wound in a direction opposite from that of the first spring 50, and having a first end 58 and a second end 60, is concentrically disposed within the housing 12 between the rod 42 and the first spring 50. The second spring 56 is diametrically sized such that its first end 58 is seated on the annular second shoulder 36, and such that, in the pre-ejection configuration illustrated in FIG. 1a, the tube 26 projects into a space between the rod 42 and the second spring 56 and serves as a first portion of a second spring guide which substantially prevents buckling of the second spring 56.

One skilled in the art will appreciate that mounting two springs, one substantially within the other, permits a relatively large amount of spring energy to be stored in a relatively small space. This provides a particularly important advantage in a spacecraft in which available space is limited. Furthermore, by winding the first and second springs, 50 and 56 respectively, in opposite directions, the chances are reduced that the springs will become tangled with one-another. Finally, one skilled in the art will realize that the size and spring force of the first and second springs, 50 and 56 respectively, is a matter of design choice which depends upon the particular needs of a given payload launch. In one particular embodiment, the combined peak spring force of the first spring 50 and the second spring 56 is approximately 1,000 LBs.

An elongated hollow cylindrical member 62 having a first end 64 and a second end 66 is concentrically disposed about a substantial portion of the rod 42. The member 62, which is disposed between the rod 42 and second spring 56, in close physical proximity to the second spring 56, serves as a second portion of a second spring guide to substantially prevent buckling of the second spring 56.

The hollow cylindrical member 62 is secured to the rod 42 by suitable means. For example, as best shown in FIG. 2, a bushing 68 may be interposed between the member 62 and the rod 42 to provide a tight frictional grip between the member 62 and the rod 42. The bushing 68 advantageously permits differential thermal expansion of the member 62 and the rod 42 without damage to either.

Figure 4:
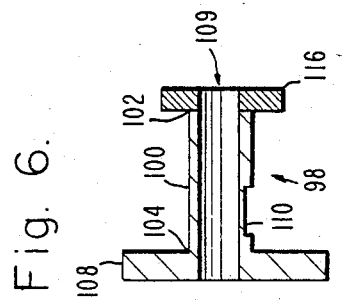
FIG. 4 is a longitudinal section view of the piston of the rod-driving assembly of the preferred embodiment of FIGS. 1a and 1b.

As shown in FIGS. 3 and 4 an integral piston 70 having a disk-shaped portion 72 is slidably mounted concentrically within the housing 12. The piston 70 defines a central cylindrical opening 73 therethrough sized to provide a close fit about the rod 42 which is inserted through the central opening 73 and is secured to the piston 70 by suitable means, such as by a screw 74. The piston 70 includes an annular outer third shoulder 76 upon which the second end 54 of the first spring 50 is seated and an integral annular inner fourth shoulder 78, which upstands from the disk-shaped portion 72, and upon which the second end 60 of the second spring 56 is seated.

The piston 70 is secured to the hollow cylindrical member 62 by suitable means such as by a cylindrical lip 80, with an outer threaded surface, which upstands from the perimeter of the central cylindrical opening 73 and which is sized to interfit with a complementary threaded surface of the second end 66 of the hollow cylindrical member 62.

Figure 5:
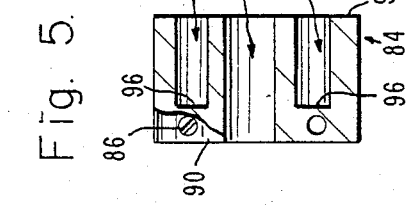
FIG. 5 is a longitudinal section view of the second end closure of the rod-driving assembly of the preferred embodiment of FIGS. 1a and 1b.

FIGS. 3 and 5 best depict a substantially cylindrical second end closure 84 which is diametrically sized to fit snuggly within the housing 12 between the second end 16 thereof and the piston 70. The second end closure 84 is secured to the housing 12 by suitable means such as by four screws 86 (only two of which are shown).

The second end closure 84 defines an axial passage 88 diametrically sized to permit passage of the rod 42 as described below. The axial passage 88 connects an outer planar portion 90 disposed outside the housing 12 and an inner contoured portion 92 disposed inside the housing 12. The inner contoured portion 92 defines an annular recess 94 about a portion of the axial passage 88. The annular recess 94 includes a fifth shoulder 96 disposed at the bottom thereof.

Figure 6:
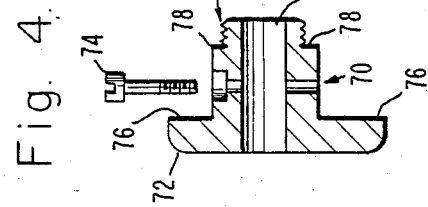
FIG. 6 is a longitudinal section view of the end cap of the rod-driving assembly of the preferred embodiment of FIGS. 1a and 1b.

An integral end cap 98 is best shown in FIGS. 3 and 6. The end cap 98 comprises a cylindrical section 100, having a greater longitudinal dimension than the axial passage 88 and having a first end 102 and a second end 104. The cylindrical section 100 is slideably mounted within the axial passage 88. The first end 102 depends within the housing 12, and the second end 104 terminates in an outward-directed circular planar flange 108. The end cap 98 defines an axial cylindrical opening 109 sized to permit slideable movement therethrough by the rod 42.

The cylindrical section 100 is provided with a longitudinal groove 110, along a portion of an outer surface thereof, into which a guide pin 107 projects. In the preferred embodiment, the guide pin 107 projects in a transverse direction through a portion of the second end closure 84 and through an opening in the axial passage 88 whereupon it cooperates with the groove 110 to prevent unwanted rotation of the end cap 98 within the axial passage 88.

A third cylindrical compression spring 111 having a first end 112 and a second end 114 is seated within the annular recess 94. The third spring 111 is diametrically sized such that its first end 112 may be secured to the first end 102 of the cylindrical section 100 by suitable means such as by retaining washer 116 secured to the first end 102. The second end 114 is seated within the annular recess 94 in abutting contact with the fifth shoulder 96.

The third spring 111 provides a spring force which maintains the outward-directed flange 108 in abutting contact with the outer planar portion 90 of the second end closure 84 prior to payload ejection.

The spring force of the third spring 111 is substantially less than that of the combined first and second springs, 50 and 56 respectively. In one embodiment, the third spring 111 has a peak spring force of approximately 10 LBs.

Figure 7:
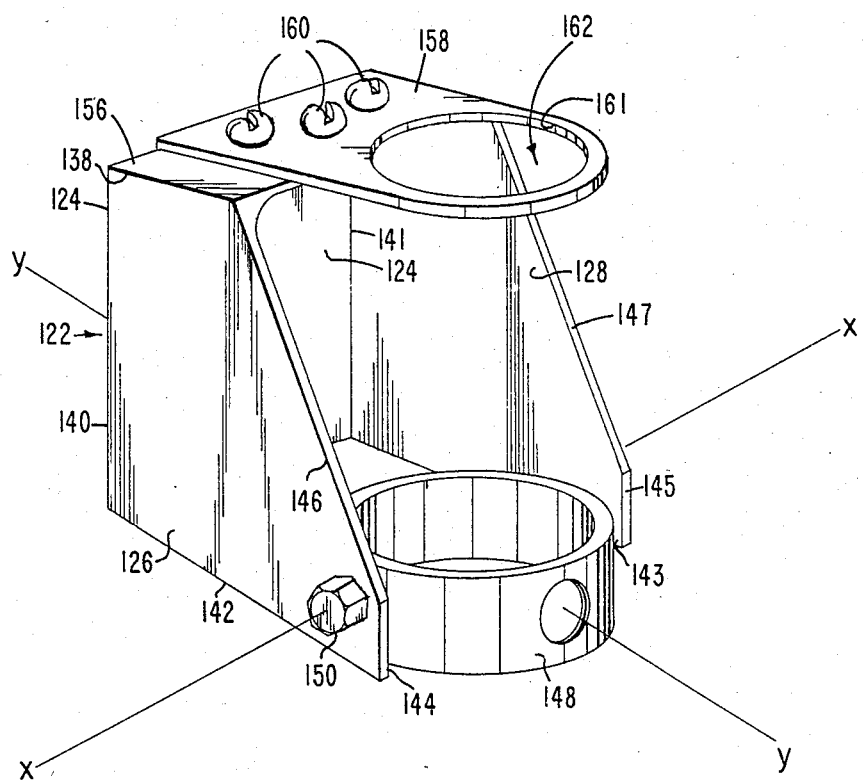
FIG. 7 is a perspective partially exploded view of the bracket, support collar and retaining ring of the preferred embodiment of FIGS. 1a and 1b.

As shown in FIG. 7, the preferred embodiment includes an integral bracket 122 comprising a rectangular cross-plate 124 having a first arm 126 and a second arm 128, each upstanding perpendicularly from an opposite side thereof.

The first arm 126 comprises a five sided plate in which a first side 138 is adjacent to a second side 140 which is adjacent to a third side 142 which is adjacent to a fourth side 144 which is adjacent to a fifth side 146 which is adjacent to the first side 138. The first side 138 and the second side 140 join in a 90° angle as do the second side 140 and the third side 142 and as do the third side 142 and the fourth side 144. The first side 138 is shorter than the third side 142 such that the fourth side 144 joins the fifth side 146 in an obtuse angle.

The second arm 128 is substantially identical in structure to the first arm 126 and has corresponding first (not shown), second, third, fourth and fifth sides, 139, 141, 143, 145 and 147, respectively.

A cylindrical support collar 148 is swivel-mounted between the first arm 126 and the second arm 128 adjacent to the third and fourth sides, 142/143 and 144/145 respectively, of the respective arms 126 and 128. The support collar 148 swivels about a first swivel axis of rotation x-x which extends perpendicularly through the first and second arms, 126 and 128 respectively, and which extends in a direction perpendicular to the central axis of the support collar 148. The swivel-mounted support collar 148 is secured to the respective first and second arms, 126 and 128, by suitable means such as by two first swivel screws 150 (only one of which is shown) which are axially aligned with the first swivel axis of rotation x-x and which are inserted into diametrically opposite sides of the support collar 148.

Figure 8A:
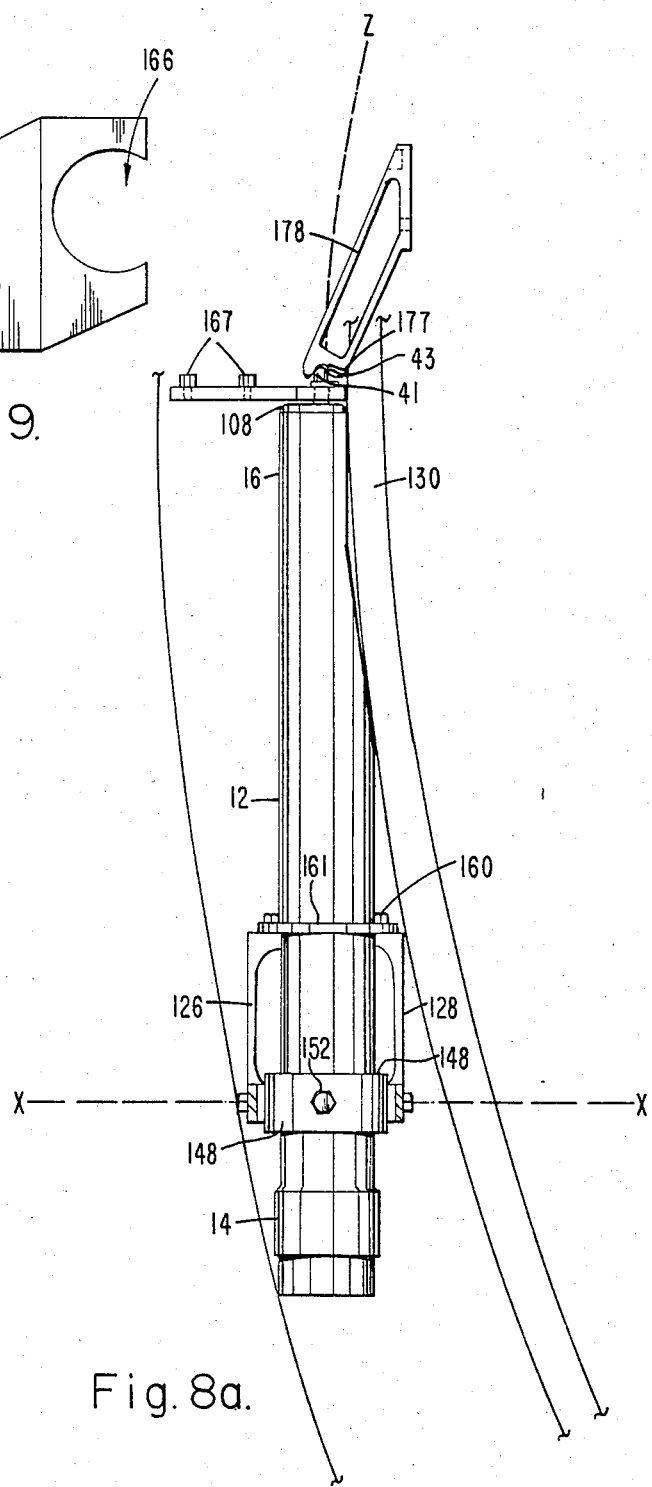
FIGS. 8a and 8b are longitudinal views of the preferred embodiment wherein the respective views are taken along line y-y of FIG. 7 and along line x-x of FIG. 7 and wherein the respective views show the preejection and post-ejection configurations.
Figure 8B:
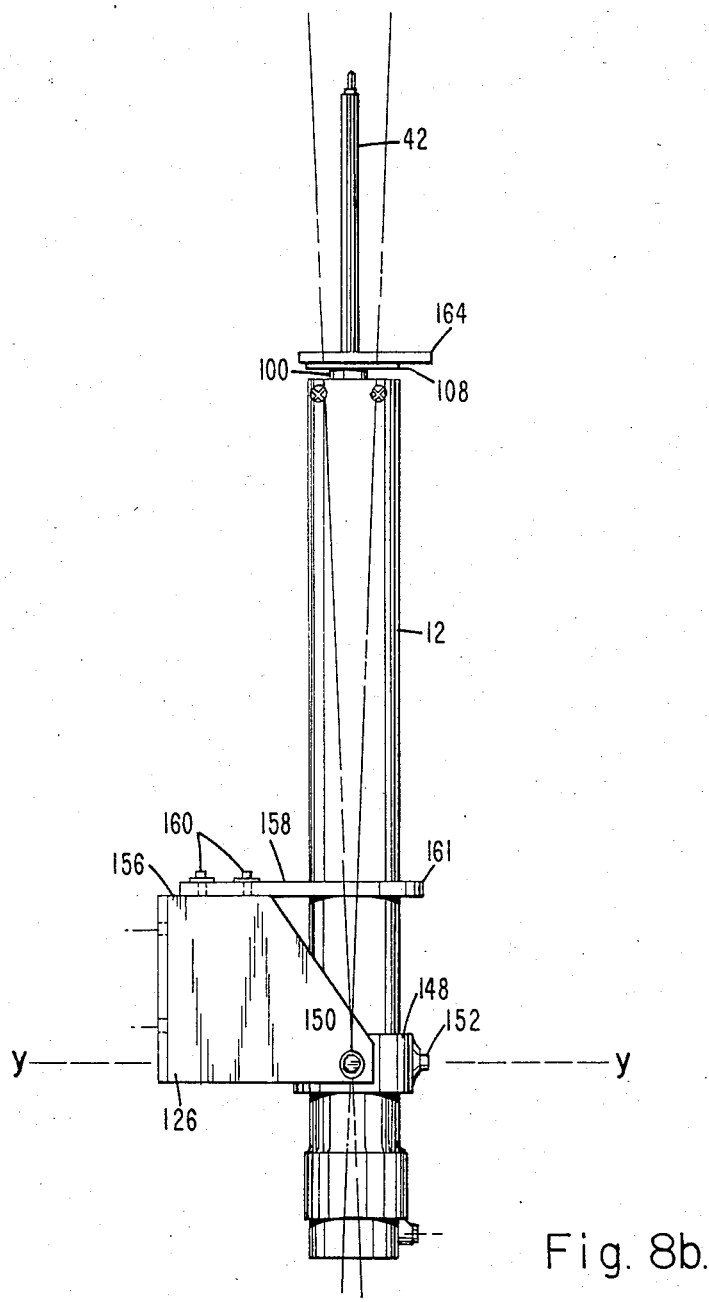

FIGS. 2, 8a and 8b depict the housing 12 swivel-mounted within the bracket-mounted support collar 148. As will be appreciated from FIG. 8b, the housing 12 swivels, relative to the support collar 148, about a second swivel axis y-y which is perpendicular to the first swivel axis x-x and which intersects the first swivel axis x-x on the central axis of the housing 12.

More particularly, as shown in FIGS. 1a and 1b, two swivel mounting fittings 118 protrude from diametrically opposite sides of the housing 12 in a common plane perpendicular to the axis of the housing 12. Referring now to FIG. 8b, the housing 12, which extends through the support collar 148, is swivel-mounted within the support collar 148 by two second swivel screws 152 (only one of which is shown) which project through diametrically opposite sides of the support collar 148 and cooperate with the swivel mounting fittings 118, in a manner which will be understood by those of ordinary skill in the art, to permit the housing 12 to swivel about the second swivel axis y-y.

Referring once again to FIG. 7, an integral cross-member 156 bridges the respective first sides 138 and 139 (not shown) of the respective first and second arms 126 and 128. An integral plate 158 is secured to the cross-member 156 by suitable means such as by three screws 160. The plate 158 extends in a plane parallel to the plane of the cross-member 156. The plate 158 defines a circular retaining ring 161 about a circular opening 162 with a diameter greater than that of the housing 12. The retaining ring 161 is centered about an axis which intersects the point of intersection of the respective first and second swivel axes, x-x and y-y.

As will be understood from FIGS. 7, 8a and 8b, the housing 12 extends through the opening 162 defined by the retaining ring 161. The retaining ring 161 confines the swivel motion of the housing 12 and thereby limits its rotation about the respective first and second swivel axis, x-x and y-y.

Figure 9:
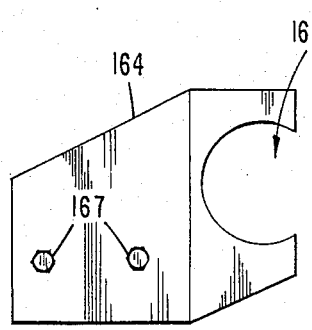
FIG. 9 is a top elevation view of the retaining collar of the preferred embodiment of FIGS. 1a and 1b.

As best shown in FIGS. 8a, 8b and 9, a retaining collar 164, comprising a plate defining an opening 166, is secured to the cradle 130 by suitable means such as by screws 167. The retaining collar 164 is mounted with its opening 166 in concentric relation to the opening 162 defined by the retaining ring 161. The opening 166 is diametrically sized wide enough to permit substantially unrestricted axial movement of the rod 42 irrespective of the prescribed swivel motion of the housing 12, but too narrow to permit passage therethrough of the outward-directed flange 108.

Referring to FIGS. 1a and 1b, the retaining collar 164 is axially displaced from the outward-directed flange 108 of the end cap 98 such that the outward-directed flange 108 is driven into tight abutting contact with the retaining collar 164 by the piston 70 after release of the respective first and second springs, 50 and 56.

The operation of the preferred embodiment of the ejection mechanism 10 is explained in the following paragraphs.

FIG. 1a provides a sectional view of the ejection mechanism 10 in a pre-ejection configuration with the respective first and second springs 50 and 56 in a compressed configuration and with the third spring 111 exerting a force which substantially prevents unwanted axial motion of the end cap 98 by retaining the outward-directed flange 108 seated against the second end closure 84.

Referring to FIGS. 8a and 9, one will appreciate that in the pre-ejection configuration, the end tip 41 extends through the semicircular opening 166 defined by the retaining collar 164. The hemispherical portion 43 of the end tip 41 is seated in abutting contact with a predetermined locus of points 177 within a concave region on a fitting 178 (which forms no part of the present invention) which comprises a portion of the payload ejected from the spacecraft cradle 130.

Release of the first and second springs, 50 and 56 respectively, is accomplished in a manner described in commonly assigned U.S. Pat. Nos. 4,303,214 and 4,290,570. Neither the method nor the apparatus for releasing the compressed first and second springs, 50 and 56 respectively, comprise any part of the present invention and, therefore, the release may be described by reference to the above two U.S. Patents which are incorporated herein by this reference.

Upon release, the respective first and second springs 50 and 56 drive the piston 70 and the rod 42 attached thereto toward the locus of points 177, and the payload is ejected from the cradle 130 with translational and rotational motion in a manner described in commonly assigned U.S. Pat. Nos. 4,359,201; 4,303,214 and 4,290,570.

Referring to FIG. 8a, the curved dashed line labelled Z represents the path of the locus of points 177 as the rod 42 drives the payload from the spacecraft. One skilled in the art will understand that as the rod 42 is driven toward the locus of points 177, the housing 12 can swivel about the first and second swivel axes, x-x and y-y, so as to permit the hemispherical portion 43 of the end tip 41 to substantially remain in abutting contact with the locus of points 177 on the fitting 178 substantially throughout the period of time that the rod 42 drives the payload from the spacecraft. Thus, the rod 42 imparts the ejection force substantially without incurring sliding motion along the surface of the fitting 178 and, therefore, substantially without introducing unwanted frictional losses.

As will be appreciated from FIGS. 8a and 8b, the retaining ring 161 limits the angular swivel motion of the housing 12 about the respective first and second swivel axes, x-x and y-y, and thereby substantially prevents the housing 12 from banging into the spacecraft cradle 130 during payload ejection.

As illustrated in FIG. 1b, the piston stroke ends when the disk-shaped portion 71 drives the outward-directed flange 108 into abutting contact with the retaining collar 164. The spring-driven piston 70 contacts the first end 102 of the end cap 98, overcomes the force of the third spring 111, and drives the outward-directed circular flange 108 into tight abutting contact with the retaining collar 164 which stops the relative axial motion of the piston 70 within the housing 12.

FIGS. 1a, 1b and 8a most clearly show that the substantially cylindrical housing 12 has a wedge-shaped section missing from the second end 16 thereof adjacent to the payload (not shown) to permit the ejection mechanism to swivel within the limited space adjacent to the payload. For the same reason, the outward-directed flange 108 has a larger radial dimension opposite the payload than adjacent to it. As shown in FIG. 3, the guide pin 107 cooperates with the groove 110 to prevent rotation of the outward-directed flange 108 during payload ejection to thereby prevent the larger radial dimension of the outward-directed flange 108 from rotating into a position in which it might bang into the payload during payload ejection.

Thus, the ejection mechanism 10, imparts an ejection force to a substantially constant locus of points 177 on a payload ejected from a spacecraft with translational and rotational motion without incurring substantial unwanted frictional losses. The ejection mechanism 10 achieves this result by providing a swivel-mounted housing 12 from which a rod 42 is driven toward the locus of points 177. The housing 12 swivels to follow the motion of the payload during ejection to permit the rod 42 to maintain abutting contact with the locus of points 177 without substantial relative sliding motion between the rod 42 and the locus of points.

Furthermore, the housing 12 is provided with an end cap 98 which, after payload ejection, engages a retaining collar 164 secured to the cradle 130 and substantially prevents the housing 12 from incurring unwanted swivel-motion.

It is understood that the above-described embodiment is merely illustrative of many possible specific embodiments which can represent principles of the present invention. Numerous and varied other arrangements can readily be devised in accordance with these principles by those skilled in the art without departing from the spirit and scope of the invention.

What is claimed is:

1. An ejection mechanism for imparting an ejection force to a substantially constant locus of points on a payload ejected from a spacecraft comprising:
    a rod having a contact end for being placed in abutting contact with the substantially constant locus of points;
    a housing in which the rod is slideably mounted for securing the rod to the spacecraft and for permitting movement of the rod relative to the spacecraft, the housing having a first aperture from which the rod protrudes during ejection of the payload;
    first and second compressible cylindrical springs;
    means for causing the first and second springs to drive the contact end of the rod towards the locus of points upon release of the first and second springs to impart translational and rotational motion to the payload; and
    means for permitting the contact end of the rod to substantially maintain abutting contact with the locus of points as the rod is driven towards the locus of points and the payload is ejected from the spacecraft.

2. An ejection mechanism as in claim 1 wherein the first spring is disposed about the second spring.

3. An ejection mechanism as in claim 2 wherein the first and second springs are mounted within said housing in concentric relation to the rod.

4. An ejection mechanism as in claim 2 wherein the housing defines a first spring guide for the first spring.

5. An ejection mechanism as in claim 4 and further comprising:
    a second spring guide mounted such that the second spring is substantially disposed about the second spring guide.

6. An ejection mechanism as in claim 2 wherein the first and second springs are oppositely wound.

7. An ejection mechanism as in claim 1 wherein the contact end of the rod includes a tip having a hemispherical shape.

8. An ejection mechanism as in claim 1 wherein the means for causing the contact end of the rod to substantially maintain abutting contact with the locus of points comprises means for permitting the housing to rotate relative to first and second substantially mutually perpendicular intersecting axes of rotation.

9. An ejection mechanism as defined in claim 8 and further comprising means for substantially preventing rotational movement of the housing after ejection of the payload.

10. An ejection mechanism as defined in claim 8 and further comprising means for limiting the rotational movement of the housing during the ejection of the payload.

11. An ejection mechanism for imparting an ejection force to a substantially constant locus of points on a payload ejected from a spacecraft comprising:
a rod having a contact end for being placed in abutting contact with the substantially constant locus of points on the payload;
a substantially cylindrical housing defining an elongated passage, a rod guide for slideable mounting of the rod, a first aperture from which the contact end of the rod protrudes during ejection of the payload and a first spring guide;
means for securing the housing to the spacecraft;
a compressible cylindrical first spring mounted within the passage adjacent to the first spring guide in concentric relation to the rod;
a compressible cylindrical second spring mounted within the passage in concentric relation to the rod;
means for connecting the first and second springs to the rod, such that, upon release of the first and second springs, the contact end of the rod is driven by spring force toward the locus of points to impart translational and rotational motion to the payload; and
means for permitting the contact end of the rod to substantially maintain abutting contact with the locus of points as the rod is driven toward the locus of points and the payload is ejected from the spacecraft.

12. An ejection mechanism as in claim 11 wherein the means for connecting comprises a piston disposed within the passage, attached to the rod and seated adjacent to the first and second springs such that the first and second springs drive the piston and the rod attached thereto toward the locus of points upon release of the first and second springs.

13. An ejection mechanism as in claim 12 and further comprising:
a retaining collar attached to the spacecraft, the retaining collar defining a second aperture aligned and sized to permit movement therethrough by said rod; and
an end cap defining a third aperture aligned with the first aperture and sized to permit slideable movement therethrough by the rod, the end cap having a portion slideably mounted within the passage such that the spring-driven piston drives the end cap into tight abutting engagement with the retaining collar upon ejection of the payload.

14. An ejection mechanism as in claim 13 and further comprising a compressible cylindrical third spring, having a lesser spring force than the combined spring forces of the first and second springs, mounted within the housing, such that the third spring retains the end cap in a substantially constant position spatially separated from the retaining collar until the spring-driven piston overcomes the third spring and drives the end cap into tight abutting contact with the retaining collar.

* * * * *